(12) United States Patent
Yin

(10) Patent No.: US 9,983,436 B2
(45) Date of Patent: May 29, 2018

(54) BACKLIGHT MODULE AND DISPLAY DEVICE

(71) Applicants: BOE TECHNOLOGY GROUP CO., LTD., Beijing (CN); K-TRONICS (SUZHOU) TECHNOLOGY CO., LTD., Suzhou, Jiangsu (CN)

(72) Inventor: Zhi Yin, Beijing (CN)

(73) Assignees: BOE TECHNOLOGY GROUP CO., LTD., Chaoyang District, Beijing; K-TRONICS (SUZHOU) TECHNOLOGY CO., LTD., Wujiang District, Suzhou, Jiangsu (CN)

( * ) Notice: Subject to any disclaimer, the term of this patent is extended or adjusted under 35 U.S.C. 154(b) by 21 days.

(21) Appl. No.: 15/104,341

(22) PCT Filed: Jan. 5, 2016

(86) PCT No.: PCT/CN2016/070098
§ 371 (c)(1),
(2) Date: Jun. 14, 2016

(87) PCT Pub. No.: WO2017/004970
PCT Pub. Date: Jan. 12, 2017

(65) Prior Publication Data
US 2017/0219883 A1    Aug. 3, 2017

(30) Foreign Application Priority Data
Jul. 6, 2015    (CN) .......................... 2015 1 0389189

(51) Int. Cl.
*G02F 1/1335*    (2006.01)
(52) U.S. Cl.
CPC .. *G02F 1/133608* (2013.01); *G02F 1/133603* (2013.01); *G02F 1/133605* (2013.01); *G02F 1/133606* (2013.01)

(58) Field of Classification Search
CPC ...... F21V 7/008; F21V 7/0025; F21V 7/0033; F21V 13/04; F21V 7/04; F21Y 2101/00;
(Continued)

(56) References Cited

U.S. PATENT DOCUMENTS

| 2009/0073350 A1* | 3/2009 | Toyama | ............ G02F 1/133603 349/69 |
| 2014/0022490 A1 | 1/2014 | Baek et al. | |
| 2014/0286052 A1 | 9/2014 | McCollum et al. | |

FOREIGN PATENT DOCUMENTS

| CN | 1892342 A | 1/2007 |
| CN | 201028402 Y | 2/2008 |

(Continued)

OTHER PUBLICATIONS

Third Office Action dated Jan. 25, 2017 in corresponding Chinese Application No. 201510389189.2.
(Continued)

*Primary Examiner* — Hargobind S Sawhney
(74) *Attorney, Agent, or Firm* — Nath, Goldberg and Meyer; Joshua B. Goldberg

(57) ABSTRACT

The present invention belongs to the field of display technology, and particularly relates to a backlight module and a display device. The backlight module comprises a reflecting layer and a diffuser plate arranged opposite to each other, wherein a light source is arranged between the reflecting layer and the diffuser plate, a light-exiting surface of the light source faces the reflecting layer, and light emitted from the light source is reflected by the reflecting layer to reach the diffuser plate and exits from the diffuser plate after being diffused therein. By inversely arranging an LED light source or other light sources between the diffuser plate and the reflecting layer in the backlight module, a thickness of the whole backlight module can be smaller under a condition of (Continued)

fixed light mixing distance, the emergent light from the backlight module is more uniform, and the cost is reduced.

15 Claims, 3 Drawing Sheets

(58) Field of Classification Search
    CPC ............. F21Y 2103/10; F21Y 2105/10; G02F
        1/1335; G02F 1/133602; G02F 1/133603;
        G02F 1/133604; G02F 1/133605; G02F
        1/133606; G02F 1/133607; G02F
        1/133608; G02F 1/133611
    See application file for complete search history.

(56) References Cited

FOREIGN PATENT DOCUMENTS

| | | |
|---|---|---|
| CN | 101169539 A | 4/2008 |
| CN | 101517467 A | 8/2009 |
| CN | 201547597 U | 8/2010 |
| CN | 202209593 U | 5/2012 |
| CN | 102588828 A | 7/2012 |
| CN | 102661538 A | 9/2012 |
| CN | 102980104 A | 3/2013 |
| CN | 103090272 A | 5/2013 |
| CN | 202927639 U | 5/2013 |
| CN | 104296008 A | 1/2015 |
| CN | 105156941 A | 12/2015 |

OTHER PUBLICATIONS

International Search Report dated Mar. 25, 2016 issued in corresponding International Application No. PCT/CN2016/070098 along with an English translation of the Written Opinion of the International Searching Authority.
First Office Action dated May 30, 2016 issued in corresponding Chinese Application No. 201510389189.2.
Second Office Action dated Oct. 27, 2016 issued in corresponding Chinese Application No. 201510389189.2.

\* cited by examiner

BACKLIGHT MODULE AND DISPLAY DEVICE

This is a National Phase Application filed under 35 U.S.C. 371 as a national stage of PCT/CN2016/070098, filed Jan. 5, 2016, an application claiming the benefit of Chinese Application No. 201510389189.2, filed Jul. 6, 2015, the content of each of which is hereby incorporated by reference in its entirety.

FIELD OF THE INVENTION

The present invention relates to the field of display technology, and particularly to a backlight module and a display device.

BACKGROUND OF THE INVENTION

At present, backlight modules in liquid crystal display devices mainly include two types of edge-type and direct-type, and generally, an LED (Light Emitting Diode) is used as a light source in the backlight module. The edge-type backlight module generally adopts a light guide plate while the direct-type backlight module generally adopts a diffuser plate, so that the light emitted from the light source forms a uniform surface light source. In order to reduce cost, the direct-type backlight module adopting the diffuser plate gradually replaces the edge-type backlight module adopting the light guide plate which is relatively expensive, and is widely applied in low cost products.

In the direct-type backlight module, LEDs are usually arranged on a backplane at a certain interval therebetween. In order to reduce the cost and obtain a light-exiting surface from which light is emitted uniformly, LEDs are mainly arranged in the following two manners: one manner is to arrange a large number of low power LEDs densely on a backplane, but, since the number of the LEDs is large (generally several hundred), problems of color difference and poor reliability occur; the other manner is to arrange several, even dozens of, high power LEDs on a backplane along with a secondary optical lens, in which emergence angle of the LED can be increased and the number of LEDs can be reduced, but, since the high power LED has a large volume chip and the light emitted therefrom has a high intensity, a problem of severe lamp shadow occurs, which cannot be improved even after light conversion by the secondary optical lens, in addition, as the light having high intensity needs a longer distance for light mixing, so that the whole backlight module has a large thickness.

SUMMARY OF THE INVENTION

In view of above shortcomings in the prior art, embodiments of the present invention provides a backlight module and a display device, in which an LED light source or other light sources is inversely arranged between a diffuser plate and a reflecting layer, such that a thickness of the whole backlight module may be smaller under a condition of fixed light mixing distance, the emergent light from the backlight module is more uniform, and the cost is reduced.

According to an embodiment of the present invention, there is provided a backlight module, comprising a reflecting layer and a diffuser plate arranged opposite to each other, wherein a light source is arranged between the reflecting layer and the diffuser plate, a light-exiting surface of the light source faces the reflecting layer, and light emitted from the light source is reflected by the reflecting layer to reach the diffuser plate and exits from the diffuser plate after being diffused therein.

Preferably, a fixing pillar is arranged on a surface of the reflecting layer facing the diffuser plate, and a height of the fixing pillar is smaller than a distance between the reflecting layer and the diffuser plate; the light source is arranged on a top end of the fixing pillar and the light-exiting surface of the light source faces the fixing pillar, and leads of the light source are integrated inside the fixing pillar.

Preferably, the fixing pillar is of a tapered structure in which a sectional area thereof is gradually increased from the top end thereof to a bottom end thereof in an axis direction of the fixing pillar, and a centre of the light-exiting surface of the light source coincides with a centre of the top end of the fixing pillar.

Preferably, the fixing pillar is made of a transparent material.

Preferably, a first light source compensation unit is arranged within an area, which at least corresponds to the light source, on a surface of the diffuser plate facing the reflecting layer and/or a surface of the diffuser plate away from the reflecting layer, and the first light source compensation unit is used for gathering light onto a centre of the area on the diffuser plate corresponding to the light source.

Preferably, the first light source compensation unit is arranged within an orthogonal projection area of the light source on the diffuser plate.

Preferably, the first light source compensation unit includes a curved structure, a diffuser mesh point, a microstructure, and a V-shaped recess or an inverted-V-shaped protrusion.

Preferably, the mesh point is formed by printing or inkjet.

Preferably, the light source is arranged on a surface of the diffuser plate facing the reflecting layer, and the leads of the light source are integrated inside the diffuser plate.

Preferably, a first light source compensation unit is arranged between the light source and the diffuser plate, and the first light source compensation unit is used for compensating a brightness within an orthogonal projection area of the light source on the diffuser plate.

Preferably, the first light source compensation unit comprises at least one auxiliary light source, and a light-exiting surface of the auxiliary light source is contrary to the light-exiting surface of the light source.

Preferably, a second light source compensation unit is arranged within a peripheral area, which surrounds at least the light source, on a surface of the reflecting layer facing the diffuser plate, and the second light source compensation unit comprises a curved structure or a diffuser mesh point.

Preferably, the light-exiting surface of the light source is arranged parallel or inclined to the diffuser plate.

According to an embodiment of the present invention, there is further provided a display device, comprising above backlight module.

The beneficial effects of the present invention are as follows: by inversely arranging the LED light source or other light sources between the diffuser plate and the reflecting layer in the backlight module, a thickness of whole the backlight module may be smaller under a condition of fixed light mixing distance, the emergent light from the backlight module is more uniform, the extraction efficiency is high, and the cost is reduced.

The display device adopting the above backlight module can achieve better backlight brightness and uniformity, so as to achieve better display performance. Meanwhile, since the

DETAILED DESCRIPTION OF THE EMBODIMENTS

Figure 1:
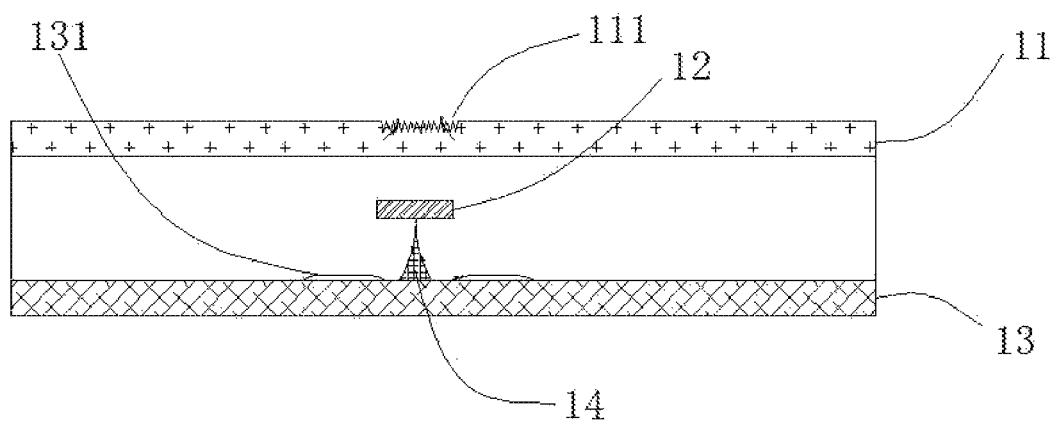
FIG. 1 is a sectional view of a backlight module in a first embodiment of the present invention.

To make those skilled in the art better understand the technical solution of the present invention, the backlight module and the display device provided by the present invention will be described below in detail in conjunction with the accompanying drawings and specific embodiments.

Embodiments of the present invention provide a direct-type backlight module suitable for the liquid crystal display devices and a display device comprising the backlight module. The backlight module comprises a reflecting layer and a diffuser plate arranged opposite to each other, a light source is arranged between the reflecting layer and the diffuser plate, and a light-exiting surface of the light source faces the reflecting layer. Light emitted from the light source is reflected by the reflecting layer to reach the diffuser plate and exits from the diffuser plate after being diffused therein. The backlight module can effectively reduce the number of LEDs and reduce a thickness of the backlight module under a condition of fixed light mixing distance, and the cost is lower.

In the drawings, regarding a structure in a layer, a surface located at a relatively higher position is defined as an upper surface of the structure in the layer, and a surface located at a relatively lower position is defined as a lower surface of the structure in the layer.

First Embodiment

The present embodiment provides a backlight module, and FIG. 1 is a sectional view of the backlight module. As shown in FIG. 1, the backlight module comprises a reflecting layer 13 and a diffuser plate 11 arranged opposite to each other, a light source 12 is arranged between the reflecting layer 13 and the diffuser plate 11, a light-exiting surface of the light source 12 faces the reflecting layer 13, and light emitted from the light source 12 is reflected by the reflecting layer 13 to reach a lower surface of the diffuser plate 11 and exits from an upper surface of the diffuser plate 11 after being diffused therein. Here, the light source 12 may be an LED light source or other light sources.

As shown in FIG. 1, a fixing pillar 14 is arranged on the reflecting layer 13, and a height of the fixing pillar 14 is smaller than a distance between the reflecting layer 13 and the diffuser plate 11. The light source 12 is arranged on a top end of the fixing pillar 14 and the light-exiting surface thereof faces the fixing pillar 14, and leads of the light source 12 are integrated inside the fixing pillar 14. Taking an LED light source as an example, the LED is fixed above the reflecting layer 13 by the fixing pillar 14, the diffuser plate 11 is located above the LED, and the reflecting layer 13 is located at a bottom end of the fixing pillar 14.

Moreover, the fixing pillar 14 is of a tapered structure in which a sectional area thereof is gradually increased from the top end thereof (i.e., the end close to the lower surface of the diffuser plate 11) to the bottom end thereof (i.e., the end contacting an upper surface of the reflecting layer 13) in an axis direction of the fixing pillar 14, and a centre of the light-exiting surface of the light source 12 coincides with a centre of the top end of the fixing pillar 14. Here, the fixing pillar 14 functions to support and fix the light source 12, and certainly, similar structures that have supporting and fixing functions may also be employed. Meanwhile, side surface of the fixing pillar 14 for supporting and fixing the light source 12 is of a curve design, so as to facilitate diffusion of light.

Preferably, the fixing pillar 14 is made of a transparent material, which absorbs no light, reflects no light and can be regard as nonexistence in an ideal condition, so as to ensure the proper propagation of the light.

In the backlight module, the light sources 12 and the fixing pillars 14 are usually arranged in pairs, and are distributed uniformly between the diffuser plate 11 and the reflecting layer 13.

In the present embodiment, since there is no light irradiated directly within an area right above the light source 12 (but still exists therein a small amount of reflected light), the area right above the light source 12 becomes a dead area for light, so that the uniformity of light exited from the light-exiting surface of the backlight module is affected. Therefore, it is preferred that a first light source compensation unit is arranged within an area (for example, an orthogonal projection area of the light source 12 on the diffuser plate 11) corresponding to the light source 12 on the upper surface the surface that is far away from the light reflecting layer 13 in FIG. 1) of the diffuser plate 11, and the first light source compensation unit is used for gathering light in other directions (e.g., light from optical films and the like) onto a centre of the area corresponding to the light source 12 on the diffuser plate 11. Here, the first light source compensation unit is arranged at least within the area corresponding to the light source 12 on the upper surface of the diffuser plate 11, and the first light source compensation unit may adopts a V-shaped structure 111 that comprises a V-shaped recess or an inverted-V-shaped protrusion. As shown in FIG. 1, by adding the V-shaped structure 111 (comprising the V-shaped recess or the inverted-V-shaped protrusion) at a position on the upper surface of the diffuser plate 11 corresponding to the light source 12, the light in other directions are gathered onto the centre of the area corresponding to the light source 12, so as to eliminate the adverse effects caused by the dead area for light, and make the light-exiting surface of the backlight module emit light uniformly.

As shown in FIG. 1, further preferably, a second light source compensation unit is also arranged within a peripheral area surrounding the light source 12 on the upper surface (i.e., the surface that faces the diffuser plate 11) of the reflecting layer 13. In this embodiment, the second light source compensation unit is a diffuser mesh point 131 arranged on the upper surface of the reflecting layer 13. The light emitted from the light source 12 can be further improved in utilization by the reflecting layer 13 and the second light source compensation unit arranged thereon.

Figure 2:
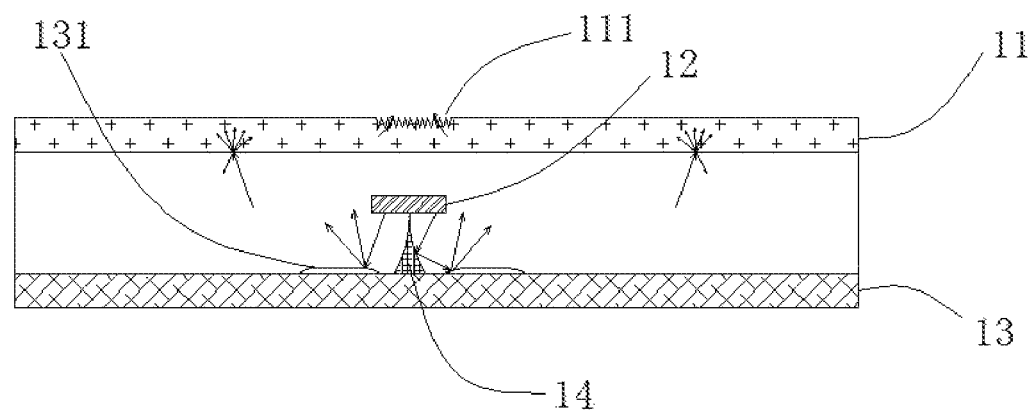
FIG. 2 is a schematic diagram illustrating a light path in the backlight module of FIG. 1.

Next, referring to FIG. 2, it shows a diagram illustrating a light path in the backlight module of FIG. 1. As shown in FIG. 2, light is emitted from a lower surface of the light source 12. A portion of the light is directly irradiated on the diffuser mesh point 131 on the reflecting layer 13 and is diffused at a reflecting interface formed on a surface of the diffuser mesh point 131, so as to be scattered and irradiated in different directions. Meanwhile, the other portion of the light is irradiated on the fixing pillar 14 and then reflected by the fixing pillar 14 to the diffuser mesh point 131 on the reflecting layer 13, so as to be diffused at the reflecting interface formed on the surface of the diffuser mesh point 131 as well, thereby being scattered and irradiated in different directions. The scattered light is irradiated on the lower surface of the diffuser plate 11 at a larger incident angle in a larger incident range, and exits from the upper surface of the diffuser plate 11 after refraction and several diffusions, so as to form the light exited from the light-exiting surface of the backlight module. The V-shaped structure (V-shaped recess or inverted-V-shaped protrusion) on the upper surface of the diffuser plate 11 can eliminate the adverse effects of the dead area for light, which is located right above the light source 12, on the light-exiting surface of the backlight module, and functions to compensate the light, so that a light-exiting surface having more uniform emergent light can be achieved. Here, it should be understood that a portion of light emitted from the light-exiting surface of the light source 12 may also pass through the fixing pillar 14 and then irradiate on the diffuser mesh point 131 in a case that the fixing pillar 14 is made of a transparent or semitransparent material.

In this embodiment, the light source 12 may be arranged parallel or inclined to the diffuser plate 11. In a case that the light source 12 is an LED, since the emergence angle of the LED is usually designed to be 120 degrees, the inclination arrangement of the light-exiting surface of the LED with respect to the diffuser plate can make the incident angle of the light is larger and the brightness is more uniform. In other cases, the parallel arrangement of the light source 12 with respect to the diffuser plate can make the light intensity is higher and the brightness is higher. In FIG. 1, the light source 12 of the direct-type backlight module is inversely arranged between the diffuser plate 11 and the reflecting layer 13, such that the light source 12 emits light from its lower surface (i.e., emits light from the surface that faces the reflecting layer 13). The inverted angle of the light source 12 is not limited to 180 degrees as shown in FIG. 1, in which the light-exiting surface of the light source 12 is parallel to a plane where the diffuser plate 11 is located or a plane where the reflecting layer 13 is located. In practical applications, the inverted angle of the light source 12 can be set according to actual requirements of the backlight module, and it can be flexibly set, for example, according to application scenarios or types of applicable liquid crystal panels, which will not be limited herein.

In the backlight module of the present embodiment, the light source is inversely arranged between the diffuser plate and the reflecting layer, such that a thickness of the whole backlight module may be smaller under a condition of fixed light mixing distance, the emergent light from the backlight module is more uniform, the number of the LEDs is reduced, and the cost is reduced.

Second Embodiment

Figure 3:
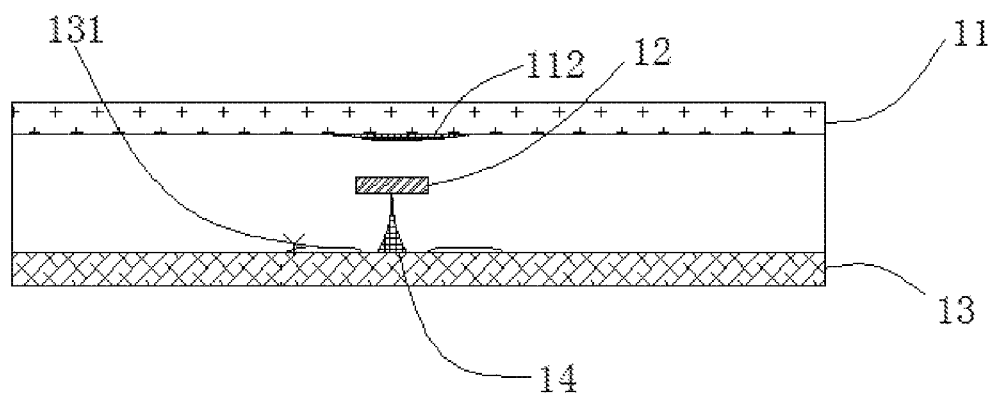
FIG. 3 is a sectional view of a backlight module in a second embodiment of the present invention.

The present embodiment provides a backlight module, and FIG. 3 shows a sectional view of the backlight module.

As shown in FIG. 3, the position and structure of the first light source compensation unit arranged on the diffuser plate 11 of the backlight module in the present embodiment are different from those in the first embodiment.

Specifically, in the present embodiment, the first light source compensation unit is arranged within an area on the lower surface (i.e. the surface that faces the reflecting layer 13) of the diffuser plate 11 corresponding to the light source 12. The first light source compensation unit in the present embodiment is a diffuser mesh point 112.

Meanwhile, similar to the first embodiment, a diffuser mesh point 131 is also arranged within a peripheral area surrounding the light source 12 on the upper surface of the reflecting layer 13.

In the present embodiment, preferably, the diffuser mesh point is formed by printing or inkjet, so as to eliminate the adverse effects on the light-exiting surface of the backlight module caused by the dead area for light right above the light source 12, and make the light-exiting surface of the backlight module emits light uniformly.

Other structures of the backlight module in the present embodiment are identical to those of the backlight module in the first embodiment; meanwhile, the light path diagram of the backlight module in the present embodiment may refer to the light path diagram of the backlight module in the first embodiment, which will not be described in details herein.

Third Embodiment

Figure 4:
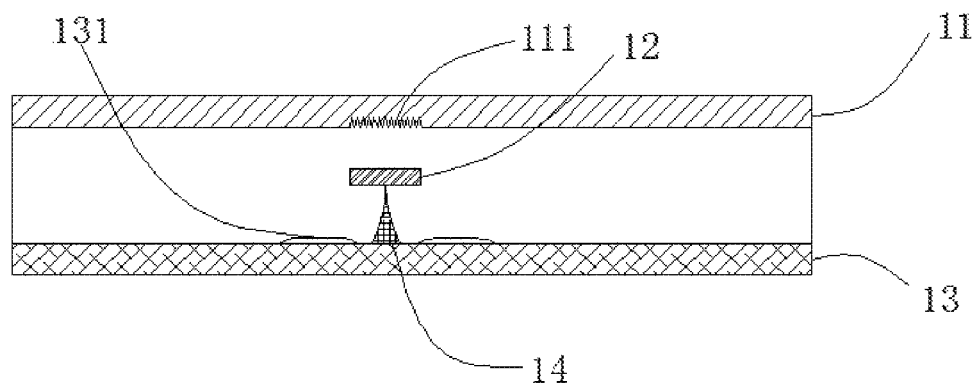
FIG. 4 is a sectional view of a backlight module in a third embodiment of the present invention.

The present embodiment provides a backlight module, and FIG. 4 shows a sectional view of the backlight module. As shown in FIG. 4, the position of the first light source compensation unit arranged on the diffuser plate 11 of the backlight module in the present embodiment is different from that in the first embodiment.

Specifically, in the present embodiment, the first light source compensation unit is arranged within an area on the lower surface (i.e. the surface that faces the reflecting layer 13) of the diffuser plate 11 corresponding to the light source 12. The first light source compensation unit in the present embodiment is a V-shaped structure 111 (comprising V-shaped recess or inverted-V-shaped protrusion) that is arranged within an area, which at least corresponds to the light source 12, on the lower surface of the diffuser plate 11, and is used for gathering light in other directions onto a centre of the area corresponding to the light source 12, so as to eliminate adverse effects of the dead area for light on the light-exiting surface of the backlight module, and make the light-exiting surface of the backlight module emits light uniformly.

Meanwhile, similar to the first embodiment, a diffuser mesh point 131 is also arranged within a peripheral area surrounding the light source 12 on the upper surface (i.e., the surface that faces the diffuser plate 11) of the reflecting layer 13.

Other structures of the backlight module in the present embodiment are identical to those of the backlight module in the first embodiment; meanwhile, the light path diagram of the backlight module in the present embodiment may refer to the light path diagram of the backlight module in the first embodiment, which will not be described in details herein.

Fourth Embodiment

Figure 5:
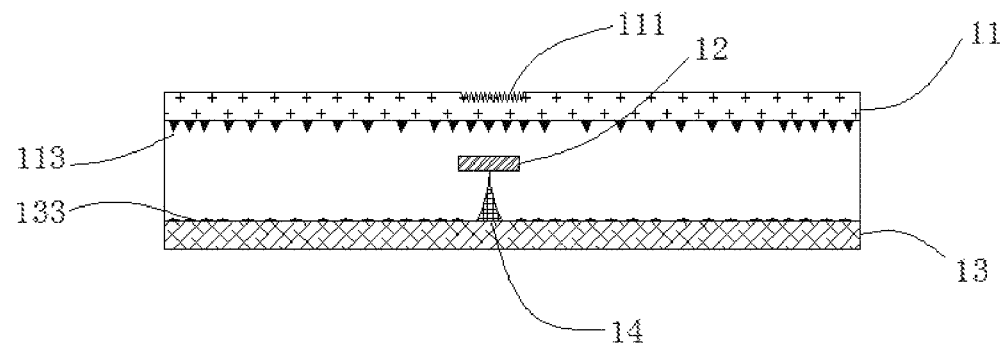
FIG. 5 is a sectional view of a backlight module in a fourth embodiment of the present invention.

The present embodiment provides a backlight module, and FIG. 5 shows a sectional view of the backlight module. As shown in FIG. 5, the structures and positions of the first light source compensation unit arranged on the diffuser plate 11 and the second light source compensation unit arranged on the light reflecting layer 13 in the backlight module in the present embodiment are different from those in the first embodiment.

Specifically, both the upper and lower surfaces of the diffuser plate 11 are provided with the first light source compensation unit. The first light source compensation unit comprises a V-shaped structure 111 (comprising V-shaped recess or inverted-V-shaped protrusion) that is arranged within an area, which at least corresponds to the light source 12, on the upper surface of the diffuser plate 11 and that is used for gathering light in other directions onto a centre of the area corresponding to the light source 12, so as to eliminate adverse effects of the dead area for light on the light-exiting surface of the backlight module. Meanwhile, the first light source compensation unit also comprises a micro-structure 113 arranged on the lower surface of the diffuser plate 11.

In addition, in the present embodiment, a diffuser mesh point 133 is arranged on the upper surface of the reflecting layer 13, but is different from the diffuser mesh point 131 in the first embodiment in that, the diffuser mesh point 133 can be arranged not only within the area (i.e., the peripheral area) corresponding to the light source 12, but also can be extended and arranged within other area (as shown in FIG. 5, the diffuser mesh point 133 is substantially arranged within the whole area except the area where the fixing pillar 14 is located). By arranging the micro-structure 113 and the diffuser mesh point 133, it is possible to make the light distributes more uniformly on the light-exiting surface of the backlight module.

Other structures of the backlight module in the present embodiment are identical to those of the backlight module in the first embodiment; meanwhile, the light path diagram of the backlight module in the present embodiment may refer to the light path diagram of the backlight module in the first embodiment, which will not be described in details herein.

Fifth Embodiment

Figure 6:
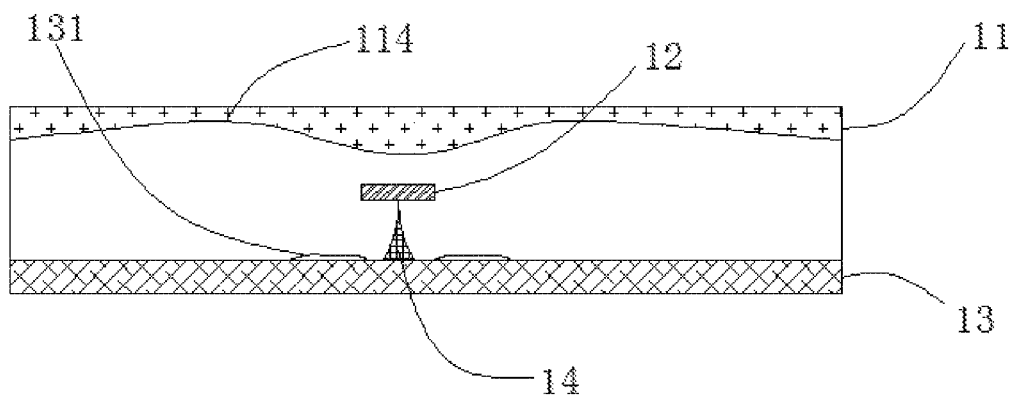
FIG. 6 is a sectional view of a backlight module in a fifth embodiment of the present invention.

The present embodiment provides a backlight module, and FIG. 6 shows a sectional view of the backlight module. As shown in FIG. 6, the structure and position of the first light source compensation unit arranged on the diffuser plate 11 are different from those in the above embodiments.

Specifically, in the present embodiment, the first light source compensation unit is arranged on the lower surface (the surface faces the reflecting layer 13) of the diffuser plate 11. The first compensation unit in the present embodiment is a curved structure 114 arranged within an area, which at least corresponds to the light source 12, on the lower surface of the diffuser plate 11, and the curved structure 114 may be further extended to other area on the lower surface of the diffuser plate 11, so as to better guide light reflected from the reflecting layer 13, eliminate adverse effects of the dead area for light on the light-exiting surface of the backlight module, and make the light distributes more uniformly on the whole light-exiting surface.

Meanwhile, similar to the first embodiment, a diffuser mesh point 131 is also arranged within a peripheral area surrounding the light source 12 on the upper surface of the reflecting layer 13.

Other structures of the backlight module in the present embodiment are identical to those of the backlight module in the first embodiment; meanwhile, the light path diagram of the backlight module in the present embodiment may refer to the light path diagram of the backlight module in the first embodiment, which will not be described in details herein.

Sixth Embodiment

Figure 7:
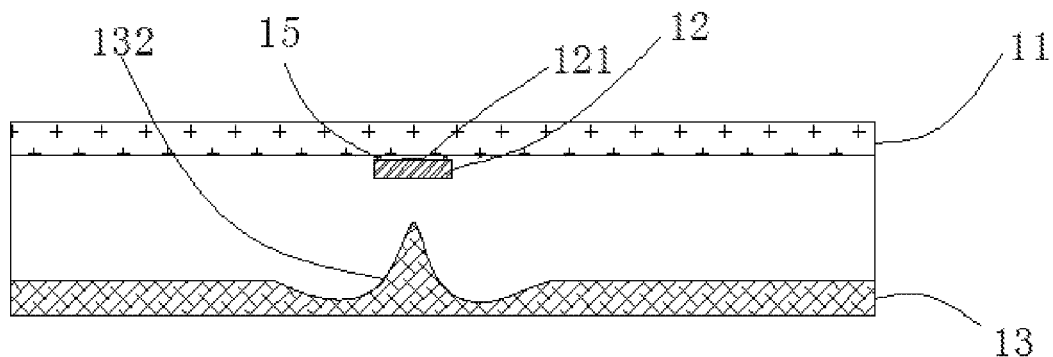
FIG. 7 is a sectional view of a backlight module in a sixth embodiment of the present invention.

The present embodiment provides a backlight module, and FIG. 7 shows a sectional view of the backlight module. As shown in FIG. 7, in the backlight module of the present embodiment, the arranged position of the light source 12, the position and structure of the first light source compensation unit, and the position and structure of the second light source unit that is arranged on the reflecting layer 13 are different from those in the above embodiments.

Specifically, in the present embodiment, the light source 12 of the backlight module is arranged on the lower surface (i.e., the surface that faces the reflecting layer) of the diffuser plate 11, in which the non-light-exiting surface (upper surface) thereof faces the diffuser plate 11 and the light-exiting surface (lower surface) thereof faces the reflecting layer 13, and leads of the light source 12 are integrated inside the diffuser plate 11. As shown in FIG. 7, different from the conventional arrangement manner in the prior art in which a light source is fixed on a backplane, the light source 12 is fixed on the lower surface of the diffuser plate 11 through a manner such as adhesion (e.g., by an adhesive 15) in the backlight module of the present embodiment, such that the light source 12 is fixed on the diffuser plate 11 and the light mixing distance is further increased.

When the light source 12 is fixed on the diffuser plate 11, light can be compensated by adding a light source compensation unit within the relevant dead area for light in a space that is formed between the light source 12 and the diffuser plate 11 (that is, between the non-light-exiting surface of the light source 12 and the lower surface of the diffuser plate 11). In the backlight module of the present embodiment, the first light source compensation unit is arranged within an area between the light source 12 and the diffuser plate 11, and is used for compensating brightness within an orthogonal projection area of the light source 12 on the diffuser plate 11. Preferably, The first light source compensation unit comprises at least one auxiliary light source, wherein the auxiliary light source may be several low power LEDs 121 or a high power LED, and the light-exiting surface of the auxiliary light source is contrary to the light-exiting surface of the light source 12, that is, the light-exiting surface of the auxiliary light source faces the diffuser plate 11. Meanwhile, the second compensation unit is also arranged within a peripheral area surrounding the light source 12 on the upper surface (i.e., the surface that faces the diffuser plate 11) of the reflecting layer 13. In the present embodiment, the second light source compensation unit is a reflective curved structure 132.

In the present embodiment, the adverse effects of the dead area for light on the light-exiting surface of the backlight module are compensated by adding low power LEDs 121, and the light mixing distance can be increased to the largest extent with the design of reflective curved structure 132 arranged on the upper surface of the reflecting layer 13, so that the uniformity of light distribution on the light-exiting surface of the backlight module is further optimized.

Other structures of the backlight module in the present embodiment are identical to those of the backlight module in the first embodiment; meanwhile, the light path diagram of the backlight module in the present embodiment may refer to the light path diagram of the backlight module in the first embodiment, which will not be described in details herein.

From the above, the first to sixth embodiments provide structures of a direct-type backlight module, and compared with those in the prior art, these structures have the following advantages:

1) An LED light source or other light sources are inversely arranged between a diffuser plate and a reflecting layer, so that a thickness of the whole backlight module can be smaller under a condition of fixed light mixing distance;

2) Other designs are proposed in view of the inversely arranged light source, for example, a V-shaped structure, a diffuser mesh point, a partial curved structure or a microstructure is formed on the diffuser plate, so that adverse effects of the dead area for light on the backlight module are eliminated and light is distributed more uniformly on the whole light-exiting surface.

3) the reflective layer is not limited to the white plane reflector, and can be provided thereon with the diffuser mesh point or partial curved structure, such that the light emitted from the light source is scattered and reflected to the diffuser plate and exits from the diffuser plate after being diffused therein, such that the light is effectively diffused and the light distribution on the light-exiting surface is more uniform. Meanwhile, since the light-exiting surface of the light source faces the reflector, the light emitted from the light source can be irradiated on the reflector directly, such that secondary conversion on the light is avoided and the extraction efficiency is improved.

4) Based on above, super power LED can be introduced into the direct-type backlight module as described in the embodiments of the present invention. Since the light-exiting surface of the super power LED faces downwardly and cooperates with the light source compensation unit, the problem of lamp shadow can be effectively avoided.

5) The number of LEDs is reduced (about 30% reduction compared with the prior art in which the high power LED is arranged on the backplane along with the secondary optical lens), so that the total cost is reduced.

Seventh Embodiment

The present embodiment provides a display device, comprising the backlight module provided by any one of the first to sixth embodiments.

The display device may be any product or part with the display function, such as a liquid crystal panel, an electronic paper, a mobile phone, a tablet computer, a television, a display, a laptop computer, a digital frame, a navigator and the like.

By adopting the structure of the above direct-type backlight module, the display device of the present embodiment can achieve a better backlight brightness and uniformity, so as to achieve a better display performance. Meanwhile, since the backlight module is thinner, a light weight and thinner display device can be achieved.

It could be understood that the above embodiments are merely exemplary embodiments adopted for describing the principle of the present invention, but the present invention is not limited thereto. Various variations and improvements may be made for those with ordinary skill in the art without departing from the spirit and essence of the present invention, and these variations and improvements shall also fall within the protection scope of the present invention.

What is claimed is:

1. A backlight module, comprising a reflecting layer and a diffuser plate arranged opposite to each other, wherein a light source is arranged between the reflecting layer and the diffuser plate, a light-exiting surface of the light source faces the reflecting layer, and light emitted from the light source is reflected by the reflecting layer to reach the diffuser plate and exits from the diffuser plate after being diffused therein, wherein a fixing pillar is arranged on a surface of the reflecting layer facing the diffuser plate, and a height of the fixing pillar is smaller than a distance between the reflecting layer and the diffuser plate; the light source is arranged on a top end of the fixing pillar and the light-exiting surface of the light source faces the fixing pillar, and leads of the light source are integrated inside the fixing pillar.

2. The backlight module according to claim 1, wherein the fixing pillar is of a tapered structure in which a sectional area thereof is gradually increased from the top end thereof to a bottom end thereof in an axis direction of the fixing pillar, and a centre of the light-exiting surface of the light source coincides with a centre of the top end of the fixing pillar.

3. The backlight module according to claim 1, wherein the fixing pillar is made of a transparent material.

4. The backlight module according to claim 1, wherein a first light source compensation unit is arranged within an area, which at least corresponds to the light source, on a surface of the diffuser plate facing the reflecting layer and/or a surface of the diffuser plate away from the reflecting layer, and the first light source compensation unit is used for gathering light onto a centre of the area on the diffuser plate corresponding to the light source.

5. The backlight module according to claim 4, wherein the first light source compensation unit is arranged within an orthogonal projection area of the light source on the diffuser plate.

6. The backlight module according to claim 4, wherein the first light source compensation unit includes a curved structure, a diffuser mesh point, a micro-structure, and a V-shaped recess or an inverted-V-shaped protrusion.

7. The backlight module according to claim 6, wherein the diffuser mesh point is formed by printing or inkjet.

8. The backlight module according to claim 1, wherein a second light source compensation unit is arranged within a peripheral area, which surrounds at least the light source, on a surface of the reflecting layer facing the diffuser plate, and the second light source compensation unit comprises a curved structure or a diffuser mesh point.

9. The backlight module according to claim 1, wherein the light-exiting surface of the light source is arranged parallel or inclined to the diffuser plate.

10. A display device, comprising a backlight module, which comprises a reflecting layer and a diffuser plate arranged opposite to each other, wherein a light source is arranged between the reflecting layer and the diffuser plate, a light-exiting surface of the light source faces the reflecting layer, and light emitted from the light source is reflected by the reflecting layer to reach the diffuser plate and exits from the diffuser plate after being diffused therein, wherein a fixing pillar is arranged on a surface of the reflecting layer facing the diffuser plate, and a height of the fixing pillar is smaller than a distance between the reflecting layer and the diffuser plate; the light source is arranged on a top end of the fixing pillar and the light-exiting surface of the light source faces the fixing pillar, and leads of the light source are integrated inside the fixing pillar.

11. The display device according to claim 10, wherein the fixing pillar is of a tapered structure in which a sectional area thereof is gradually increased from the top end thereof to a bottom end thereof in an axis direction of the fixing pillar, and a centre of the light-exiting surface of the light source coincides with a centre of the top end of the fixing pillar.

12. The display device according to claim 10, wherein the fixing pillar is made of a transparent material.

13. The display device according to claim 10, wherein a first light source compensation unit is arranged within an area, which at least corresponds to the light source, on a surface of the diffuser plate facing the reflecting layer and/or a surface of the diffuser plate away from the reflecting layer, and the first light source compensation unit is used for gathering light onto a centre of the area on the diffuser plate corresponding to the light source.

14. The display device according to claim 13, wherein the first light source compensation unit is arranged within an orthogonal projection area of the light source on the diffuser plate.

15. The display device according to claim 13, wherein the first light source compensation unit includes a curved structure, a diffuser mesh point, a micro-structure, and a V-shaped recess or an inverted-V-shaped protrusion.

* * * * *